United States Patent

Sampey

[15] 3,642,087
[45] Feb. 15, 1972

[54] AUTOMATIC GUIDANCE SYSTEM

[72] Inventor: Harry R. Sampey, Vanderbilt, Pa.
[73] Assignee: Pentron Electronics Corporation, Cleveland, Ohio
[22] Filed: Oct. 9, 1970
[21] Appl. No.: 79,445

[52] U.S. Cl............................180/98, 250/106 VC, 250/202
[51] Int. Cl..........................................................B60k 27/00
[58] Field of Search....................250/71, 106 VC, 202, 208; 180/79, 79.1, 98; 318/450, 480; 178/5; 315/77, 79, 80, 81

[56] References Cited

UNITED STATES PATENTS

| | | | |
|---|---|---|---|
| 2,317,400 | 4/1943 | Paulus | 250/106 VC |
| 2,493,755 | 1/1950 | Ferrill | 180/98 |
| 2,996,137 | 8/1961 | Chu | 180/98 |
| 3,029,893 | 4/1962 | Mountjoy | 180/98 |
| 3,353,619 | 11/1967 | Lambert | 180/98 |

*Primary Examiner*—James W. Lawrence
*Assistant Examiner*—D. C. Nelms
*Attorney*—Cushman, Darby & Cushman

[57] ABSTRACT

A method and apparatus for automatically guiding a vehicle over a predetermined course while at the same time controlling the vehicle speed and maintaining an indication of the total travelled distance which may, in turn, be used to program or control a sequence of vehicle maneuvers. Reflective or otherwise sensible elements are spaced along the centerline of a course with interelement spacings related to the desired vehicle speed and with each element having a shape that includes a dimension in the direction of vehicle travel that is variable with respect to lateral movements away from the centerline, the variable dimension being of equal magnitude with respect to either direction of lateral movement. In an exemplary embodiment, the elements are diamond-shaped light reflectors. Two photo detectors are laterally spaced apart and mounted on the vehicle so as to sense the same dimensional areas of the laterally extending arms of each diamond element. Lateral deviations of the vehicle cause these sensed dimensions to be unequal, which inequality is sensed and used to steer the vehicle in a corrective direction. Speed is controlled by the rate at which the elements are sensed while the total number of sensed elements is used to provide an indication of total travelled distance.

16 Claims, 3 Drawing Figures

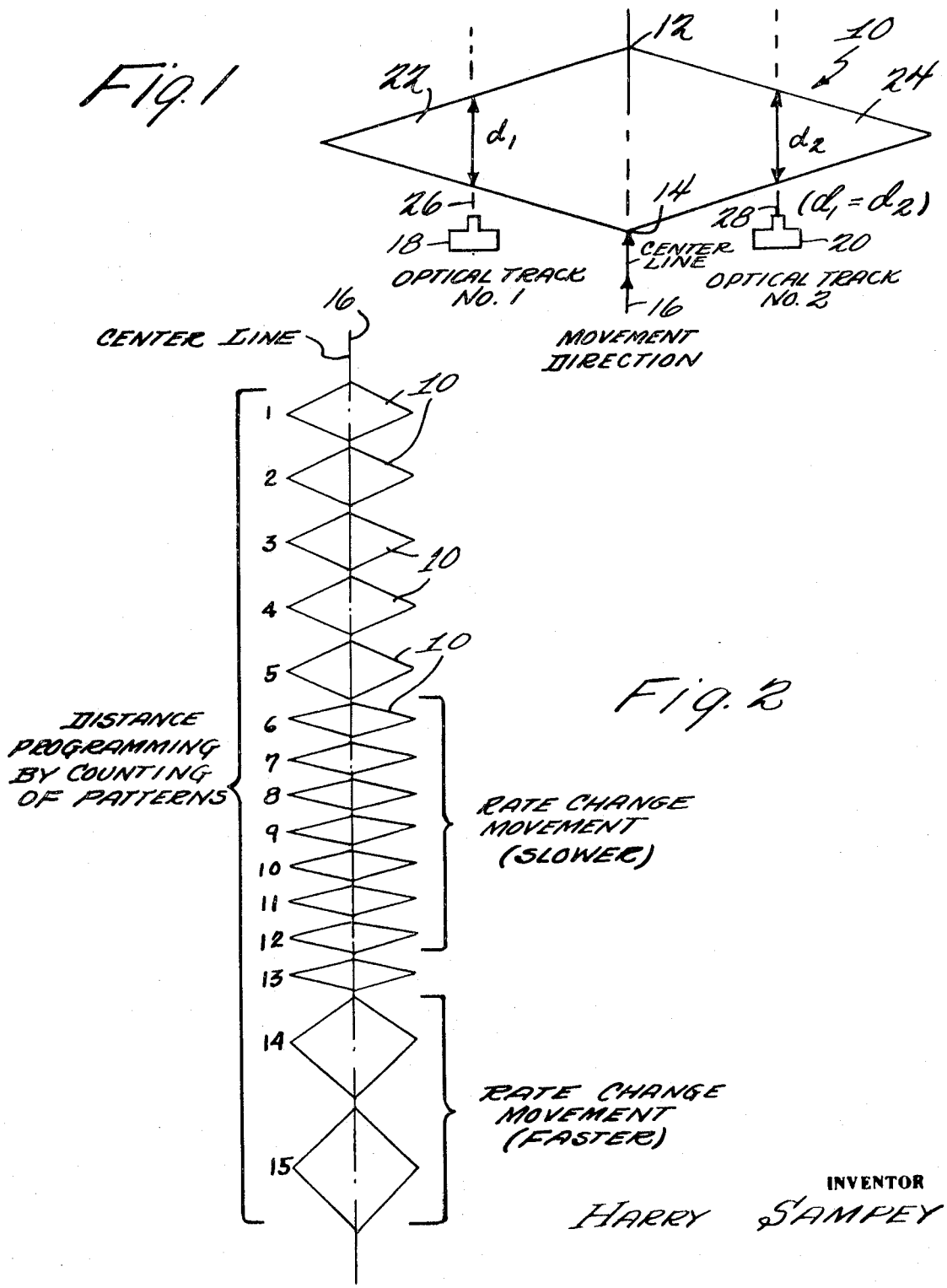

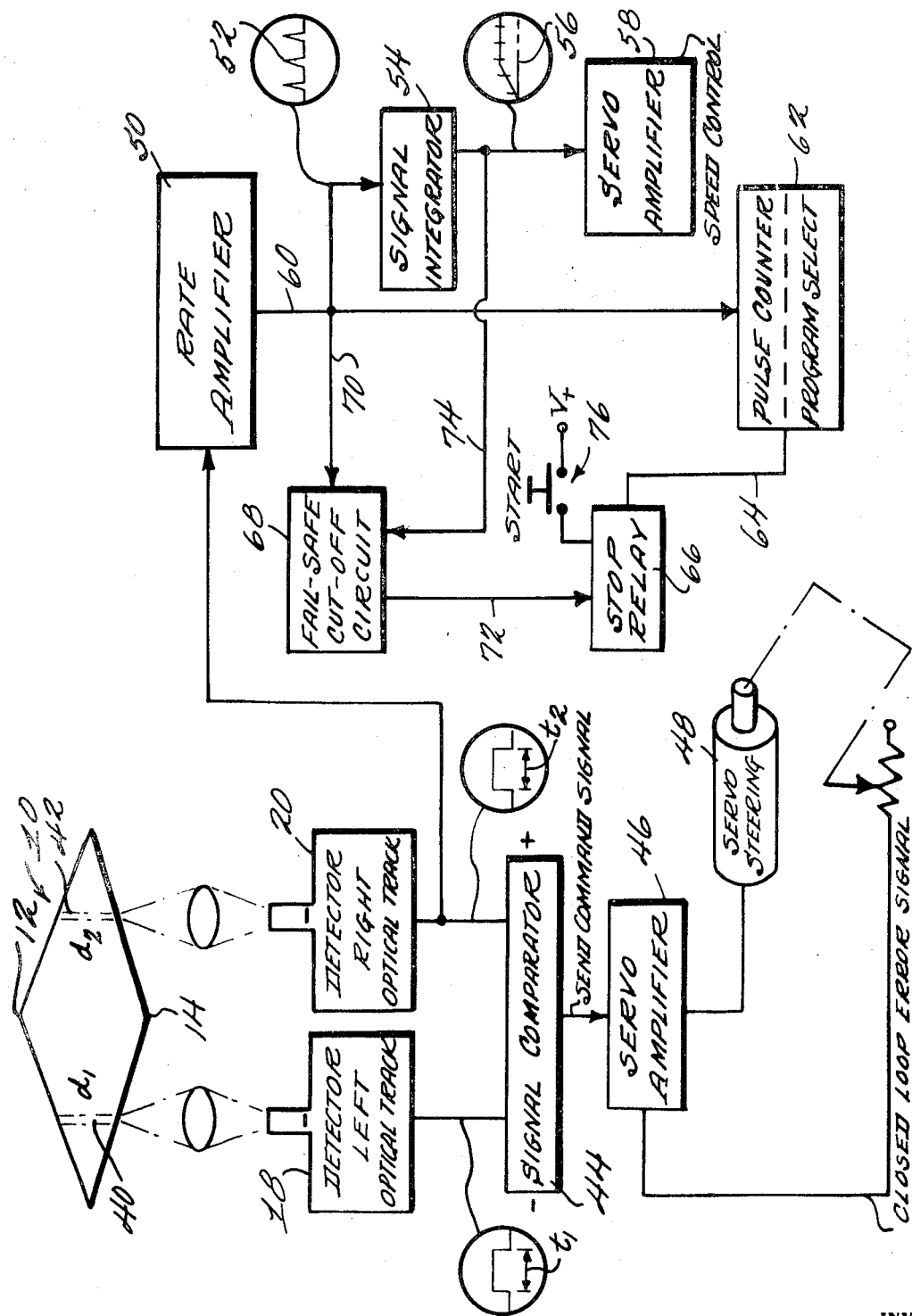

AUTOMATIC GUIDANCE SYSTEM

This invention generally relates to a system for automatically guiding a motorized vehicle along a guided course. Besides providing the capability of steering a vehicle along a predetermined course, this invention also permits the speed of the vehicle to be controlled while at the same time providing an indication of total travelled distance which may be used in combination with logic means for programming a series of vehicle maneuvers over several segments of a complex predetermined course.

Although this invention will be described particularly with respect to an automatic-guidance system for control of automobiles along highways, those skilled in the art will readily appreciate that this system could also be used for controlling the movements of other vehicles, for instance, the ground control of taxiing aircraft on airport runways.

Similarly, though the exemplary example utilizes light-reflective patterns disposed along a guided path, it should be readily apparent that other sensible kinds of patterns could just as well be utilized. That is, the patterns may be light absorbent rather than reflective, reflective of ultraviolet light, magnetically sensible, etc. Other possibilities will occur to those skilled in the art after reading the following description.

Other vehicle-control systems using alternate spaced-apart zones on a highway surface have been proposed such as, for instance, that disclosed in U.S. Pat. No. 2,493,755 to Ferrill. However, such known prior systems have failed to completely fulfill the requirements for a truly automatic and programmable vehicle-guidance system.

Accordingly, it is an object of this invention to provide a system for automatically guiding a vehicle over a predetermined guided course while at the same time, controlling the vehicle speed and maintaining an indication of the total distance travelled which may, in turn, be used to program or control a sequence of intricate vehicle maneuvers over various segments of such a predetermined course.

It is another object of this invention to provide a system for automatic vehicle guidance wherein reflective or other sensible elements are spaced along the centerline of a predetermined course with each element having a shape including a dimension in the direction of vehicle travel that is variable with respect to lateral movements away from the centerline, the variable dimension being of equal magnitude with respect to either direction of lateral movement. This invention further provides two laterally spaced-apart detectors on the vehicle so as to sense the variable dimensions on either side of the centerline and to cause corrective steering action when these sensed dimensions are no longer equal.

A further object of this invention is to provide an automatic vehicle-guidance system wherein diamond-shaped light reflectors are spaced along a predetermined course, preferably at the center of the roadway, with two of the diamond apices aligned along said course while each of the other diamond apices lies to one side of the course. Two photodetectors are laterally spaced apart and mounted on the vehicle so as to sense the dimensions of the laterally extending arms of the diamond-shaped patterns. The outputs of these photodetectors are compared and corrective steering signals are generated whenever the time duration of these outputs differs in correspondence to unequal sensed dimensions of said laterally extending arms and thus indicating a lateral deviation of the vehicle from the predetermined guided course.

It is yet another object of this invention to provide an automatic-guided vehicle system wherein the reflective or other sensible elements are spaced along the predetermined course with the number of elements per unit distance being related to the desired vehicle speed. Specifically, the number of elements per unit distance is preferably made inversely proportional to the desired speed such that the frequency of detecting such elements (proportional to the product of vehicle speed and the number of elements per unit distance) may be maintained constant to result in a desired vehicular speed.

Yet a further object of this invention is to provide such a guidance system wherein the total number of such reflective elements is maintained in a counter for comparison with a predetermined number to indicate when a corresponding predetermined distance has been travelled. When the predetermined distance corresponding to a predetermined segment of a guided course has been completed as indicated by such a comparison, the vehicle may then be automatically set upon another additional segment of a guided course. Accordingly, this feature of the invention permits programming the vehicle to follow a particular sequence of maneuvers within what may be an intricate network of guided path segments.

Another object in this invention is to provide an automatic-guidance system which includes a fail safe mechanism whereby the vehicle is automatically stopped if the time period between detection of successive reflective elements exceeds a predetermined limit.

Other objects of this invention will be apparent to those skilled in the art from the following description.

A more detailed and complete understanding of this invention may be obtained from the following detailed description and the accompanying drawings of which:

FIG. 1 is a top view of an exemplary embodiment of the shaped reflectors suitable for use with this invention, FIG. 2 is a top view of an exemplary embodiment of the shaped reflectors of FIG. 1 disposed along the centerline of a typical guided course, and FIG. 3 is a block diagram for an exemplary embodiment of a decoding apparatus for use with this invention.

Referring to FIG. 1, an exemplary embodiment of reflector 10 is shown as a diamond-shaped light-reflecting element disposed with two of the diamond apices, 12 and 14, disposed along the centerline 16 of a guided course. Of course, it should be readily appreciated by those skilled in the art that apices 12, 14 could be aligned parallel to the centerline of the course but offset therefrom by a predetermined distance. In such a case, the laterally spaced-apart detectors mounted on the vehicle are not mounted at equal distances on either side of the vehicle's center but, rather are similarly displaced towards one side or the other of the vehicle as should be apparent.

As the vehicle passes over reflector 10, photo electric detectors 18 and 20 respectively pass over opposite arms 22 and 24 of the diamond-shaped reflector. If the vehicle is properly aligned with respect to the centerline of the guided course, the detectors 18 and 20 pass over similar portions of the symmetrical diamond-shaped reflector along an optical track 26 and 28 respectively. Since these optical tracks are disposed at equal lateral distances from the centerline, distances $d_1$ and $d_2$, as detected by the time duration of pulses output from optical detectors 18 and 20, will be equal thus indicating that the vehicle is properly aligned with the centerline of the course.

However, if the vehicle is moved or displaced to one side of centerline 16, the distances $d_1$ and $d_2$ will no longer be equal but, depending upon the direction of displacement, either $d_1$ or $d_2$ will be greater than the other.

Accordingly, the time duration of pulses output from optical detectors 18 and 20 will differ in a corresponding way such that by detecting the sense and magnitude of such differences in the time periods of signals from optical detectors 18 and 20, a corrective signal of the proper sense may be derived for use in a servosystem driving a steering motor to correct the steering of the vehicle and diminish the time difference between signals detected by detectors 18 and 20. Of course, the time duration of signals from detectors 18 and 20 is inversely proportional to the vehicle's speed as well as directly proportional to the dimensions $d_1$ and $d_2$ as shown in FIG. 1. However, since both the signals from detectors 18 and 20 vary in exactly the same way with respect to the vehicle's speed, (i.e., the vehicle speed is equal at both detectors 18 and 20 for all times) this variance is self-compensating with the result that only differences in the dimensions $d_1$ and $d_2$ are detected by a comparison of the pulse time durations of pulses from detectors 18 and 20.

Of course, other shapes of reflectors could be derived for similar results. That is, the important feature of the reflector shape is that the shape incorporates a dimension along the direction of travel that is variable with respect to lateral displacements from the intended predetermined course. Of course, the diamond-shaped pattern provides a linear variation with respect to lateral displacements. However, other nonlinear shapes might also be utilized. Preferably, the functional relationship or variance with respect to lateral movements is equal for either direction of lateral displacement such that the corrective action is identical whether the undesired lateral displacements are to the left or to the right.

A series of diamond-shaped patterns is shown in FIG. 2 in spaced-apart relationship along the centerline 16 of a guided course segment. The number of elements per unit distance is variable depending upon the desired speed of the vehicle. For instance, the spacing of the elements is shown as diminishing in the middle portion of FIG. 2, while the interelement spacing drastically increases in the bottom portion of FIG. 2. Of course, this means that the number of elements per unit distance is increased in the middle portion and drastically decreased in the bottom portion of the guided course segment shown in FIG. 2. Since the rate of detecting the reflector elements 10 (i.e., the number of detected elements per unit time) is proportional to the product of vehicle speed and the number of elements per unit distance, the rate of detection may be utilized to maintain a desired vehicle speed.

That is, by adjusting the vehicle speed, the frequency or rate of element detection may be maintained constant. Accordingly, an increase in the number of element per unit distance will dictate a decrease in vehicle speed while a corresponding decrease in the number of elements per unit distance will dictate an increase in vehicle speed. Thus, the vehicle speed may be controlled by controlling the spacing of the diamond-shaped reflector elements as indicated in FIG. 2.

In addition, the number of detected elements may be counted in a counter to indicate a total distance travelled by the vehicle. For instance, as shown in FIG. 2, if the vehicle's totalizing counters are zeroed just prior to passing reflector number 1, the program counter would contain a content representing 15 after traversing all of the elements shown in FIG. 2. Assuming that the elements shown in FIG. 2 represent one segment of a possibly complex and intricate network of such segments, the vehicle could be preprogrammed to make an appropriate decision after travelling predetermined distances. That is, if a desired predetermined distance has been travelled after passing over the 15 elements shown in FIG. 2, (as detected by comparing such a predetermined number as 15 with the running total count of detected elements since the last resetting of the vehicle's counters) the vehicle may be caused to undergo a change in direction or to make a decision at this point as to which of a plurality of available further segments the vehicle is to next traverse. In this manner, the vehicle may be preprogrammed to travel along a particular route within a maze of such predetermined path segments as will be apparent to those skilled in the art.

The exemplary embodiment of particular decoding circuitry for use in this invention is shown in FIG. 3 and represents only one of several possible systems for automatically steering the vehicle by optically tracking the series of shaped track patterns such as the diamond-shaped elements 10. This system not only serves as a steering guide but also provides other information relating to speed and preprogrammed distance measurements.

Two photodetector circuits 18 and 20 respectively view similar dimensional portions 40 and 42 of the left-hand and right-hand arms of the diamond-shaped pattern shown in FIG. 3. Preferably, apices 12 and 14 of the diamond-shaped pattern are aligned with the centerline of a predetermined guided course with the detectors 18 and 20 being laterally spaced apart and mounted upon the vehicle at equal distances from the center of that vehicle. However, if it is desired, the spaced elements 10 may be located to one or the other side of the centerline of the guided course with the spaced-apart photodetectors 18 and 20 being similarly displaced with respect to the center of the vehicle.

Since the distances $d_1$ and $d_2$ as viewed when the vehicle is properly centered upon the guided course, are optically equal in length, and since the vehicle speed is always substantially equal at both detectors 18 and 20, the time duration $t_1$ and $t_2$ of output pulses from photodetectors 18 and 20 will also be proportional to these distances $d_1$ and $d_2$ respectively. The time periods of these pulses are compared in a conventional comparator 44 and, if the vehicle is properly centered, then $t_1$ equals $t_2$ and there will be no output from comparator 44. However, if the vehicle is moved to the right of the center, $t_2$ will become less while $t_1$ will increase. The sum of these differences from normal values generates a servo drive signal within the comparator of proper sense and magnitude for driving a servo amplifier 46 which in turn drives a servo-steering motor 48 in a proper direction for correcting the vehicle's deviation from the centerline of the guided course. Thus, the vehicle is maintained on the guided course with extreme accuracy since any deviation from the desired centerline of the course will cause an immediate and compound error. That is, the error will immediately cause one distance to increase while the other distance decreases and the corresponding time periods will deviate in a corresponding fashion such that the servosystem is activated to correct the deviation at the earliest possible moment.

As previously mentioned, the speed of the vehicle may be controlled by sensing and operating upon the rate of element detection. That is, the number of detected elements per unit time. Since each detected element results in a pulse from either the photodetector 18 or 20, the rate information may be conveniently obtained by operating upon the output pulses from either one of these photodetectors to determine the rate or incidence per unit time of such output pulses. Of course, as the diamond pattern draws closer together, $t_1$ and $t_2$ will both decrease; however, steering is not affected since steering is controlled by the difference between $t_1$ and $t_2$ and not the rate at which the event occurs. Therefore, the rate will only control the speed.

As shown in FIG. 3, this rate is determined by first differentiating the variable length essentially square wave pulses from photodetector 20 in rate amplifier 50 thus resulting in a series of uniformly dimensioned pulses (as shown at 52) with one such uniformly dimensioned pulse occurring for each positive going step of the square wave output from photodetector 20. Negative spikes may be suppressed by a diode as will be apparent to those skilled in the art. This series of uniformly dimensioned pulses is then input to an integrator 54 which effectively integrates such pulses over a predetermined period of time thus resulting in an output signal (as shown at 56) which is proportional to the number of pulses occurring in the predetermined time period of integration and thus proportional to the number of elements detected per unit time. This output signal is then used as an input to servoamplifier 58 to control a servocontrol loop operating a speed control means such as a servomotor driving a throttle link or other such means as will be apparent to those skilled in the art.

Since one pulse appears as output on line 60 from rate amplifier 50 for each detected reflecting element 10, these pulses may be directly input to a pulse counter 62 for totalization. In addition, pulse counter 62 may include comparison means for comparing the currently totalized number of detected elements with a predetermined programmed number to provide an output signal on line 64 whenever the predetermined number is equalled or exceeded. This output signal on line 64 may, in turn, be input to a stop relay 66 which either stops the vehicle, as at the end of a predetermined guided course, or which may be utilized to transfer the vehicle to another segment of the predetermined guided course as will be apparent to those skilled in the art. By adding appropriate logic means (not shown in FIG. 3), a whole series of such preprogrammed segmental movements of the vehicle along segments of the predetermined guided course may be controlled to effectively program the vehicle for movement along a predetermined path within an intricate maze or network of such path segments.

In addition, FIG. 3 reveals a fail safe circuit 68. The fail safe circuit may be connected directly through line 70 to the output of the rate amplifier and include circuit means for detecting the time duration between the output pulses from the rate amplifier with an emergency stop signal being output on line 72 whenever this time period exceeds a predetermined limit. Alternatively, the fail safe circuit 68 may be connected through line 74 to the output from signal integrator 54 to provide an automatic stop signal on line 72 whenever the detected rate or number of elements per unit time falls below a predetermined limit. Of course, fail safe circuit 68 may be connected to both the rate amplifier and the signal integrator as shown in FIG. 3 thus providing an additional safety factor. Special start means 76 may be utilized to override the fail safe circuit during starting movements of the vehicle as will be apparent to those skilled in the art.

As previously mentioned, the light reflective patterns used in explaining the exemplary embodiment of this invention are only used for illustrative purposes. Any type of sensible patterns may be utilized in conjunction with appropriate detectors. For instance, the pattern may be light absorbent. So long as there is approximately 10 percent difference between the pattern and the surrounding area, it may be successfully detected by optional sensors. Alternatively, patterns that fluoresce under ultra violet light may be used or the patterns may comprise magnetic tape material used with appropriate magnetic sensors. Other possibilities will be apparent to those skilled in the art.

While only one exemplary embodiment of this invention has been particularly pointed out and described in the above specification, those skilled in the art will readily appreciate that many modifications of the exemplary embodiment are possible without departing from the essential features of this invention. Accordingly, all such modifications are intended to be included within the scope of this invention.

What is claimed is:

1. A method for automatically guiding the travel of a vehicle along the centerline of a guided course of sensible elements spaced along said course with interelement spacings related to the desired speed along the course and with each element having a shape which includes a dimension in the direction of travel that is variable with respect to lateral movements in either direction away from said centerline, said method comprising the steps of:

generating a first signal proportional to the dimension of said elements in the direction of travel but at a first point laterally displaced to one side of the centerline of said course, generating a second signal proportional to the dimension of said elements in the direction of travel but at a second point laterally displaced to the outer side of said centerline by an amount substantially equal to the displacement used in generating said first signal, comparing said first and second signals to obtain an error signal proportional to the difference therebetween and hence to the sense and magnitude of any lateral deviations of the vehicle away from said centerline, driving a steering control motor with said error signal to diminish said error signal thereby correcting the vehicle's path of travel for said deviation.

2. A method as in claim 1 wherein said sensible elements are diamond-shaped patterns having two apices thereof generally aligned with said centerline and with each of the other two apices being on opposite sides of said centerline and wherein:

the first of said generating steps comprises sensing the time duration of a sensed signal received from a first point laterally displaced to one side of said centerline, the second of said generating steps comprises sensing the time duration of another sensed signal received from a second point laterally displaced to the other side of said centerline, and said comparing step comprises comparing said sensed time durations and generating said error signal as the difference therebetween, said difference effectively being proportional to the difference in dimensions of said element in the direction of travel at said first and second laterally displaced points and therefore to the sense and magnitude of any lateral deviation of said vehicle away from said centerline.

3. A method as in claim 1 further comprising the steps of:

generating a speed control signal by sensing the rate at which said sensible elements pass said vehicle, this rate being proportional to the product of the vehicle's speed and the spacing per unit distance of said elements, and controlling the vehicle's speed in dependence upon said speed control signal thereby maintaining a desired speed as indicated by the spacing of said elements.

4. A method as in claim 3 further comprising the steps of:

counting the number of said sensible elements passing said vehicle, and comparing the resulting number with a predetermined program number to provide an indication of having completed travel over a predetermined distance when said program number is equalled or exceeded.

5. A method as in claim 4 further comprising the steps of:

generating a fail safe signal proportional to the time duration occurring between the vehicle's passing of successive ones of said elements, and automatically stopping said vehicle if said fail safe signal exceeds a predetermined level.

6. Apparatus for automatically guiding the travel of a vehicle along the centerline of a guided course of sensible elements spaced along said course with interelement spacings related to a desired speed along the course and with each element having a shape which includes a dimension in the direction of travel that is variable with respect to lateral movements away from said centerline, said apparatus comprising:

first means for generating a first signal proportional to said dimension of said sensible element at a point laterally displaced to one side of said centerline, second means for generating a second signal proportional to said dimension of said sensible element at a point laterally displaced to the other side of said centerline by an amount substantially equal to the displacement used in generating said first signal, comparing means operatively connected to said first and second means for comparing said first and second signals and for obtaining an error signal proportional to the difference therebetween and hence to the sense and magnitude of any lateral deviation of said vehicle away from said centerline, and steering means operatively connected to said comparing means for automatically steering said vehicle in a direction to cause diminution of said error signal thereby correcting said deviation.

7. Apparatus as in claim 6 for use in systems wherein said sensible elements are diamond-shaped patterns having two apices thereof generally aligned along a centerline and with each of the other apices being on opposite sides of said centerline and wherein:

said first means comprises a detector for sensing said elements from a first point laterally displaced to one side of said centerline as the vehicle passes thereover to produce a first pulse having a time duration proportional to the product of vehicle speed and the variable dimension of said sensible element at said first laterally displaced point, said second means comprises another detector for sensing said elements from a second point laterally displaced to the other side of said centerline as the vehicle passes thereover to produce a second pulse having a time duration proportional to the product of vehicle speed and the variable dimension of said sensible element at said second laterally displaced point, and said comparing means comprises pulse comparison means for comparing the time duration of said first and second pulses and for producing an error signal proportional to the difference therebetween which is substantially proportional to the difference between said variable dimension of said element at said first and second laterally displaced points.

8. Apparatus as in claim 6 further comprising:
rate-sensitive means operatively connected to one of said first and second means for generating a speed control signal by sensing the rate at which said elements are passed by said vehicle, and
speed control means operatively connected to said rate-sensitive means for controlling the speed of said vehicle in dependence upon said speed control signal thereby maintaining a desired speed as indicated by the interelement spacings of said elements.

9. Apparatus as in claim 8 wherein said rate-sensitive means comprises:
differentiating means for differentiating one of said first and second signals to produce rate pulses of uniform dimensions and occurring in number proportional to the number of said elements that are being passed, and
integrating means connected to said differentiating means for integrating said rate pulses over a predetermined time period thereby producing said speed control signal having a level proportional to the number of said rate pulses occurring during said predetermined time period.

10. Apparatus as in claim 9 further comprising:
counting means for counting and totalizing said rate pulses, and
comparison means for comparing said totalized number of pulses with a predetermined program number to provide a distance control signal when said program number is equalled or exceeded, said distance control signal being available for use in indicating that a predetermined distance has been travelled.

11. Apparatus as in claim 9 further comprising:
fail safe means for sensing the time duration between said rate pulses and for generating an automatic stopping signal whenever this time duration exceeds a predetermined limit.

12. Apparatus as in claim 9 wherein said elements are light reflectors and said first and second means both comprise photodetectors.

13. A system for automatically guiding the travel of a vehicle along a guided course having a centerline, said system comprising:
diamond-shaped sensible elements disposed on a surface along said course and having two apices generally aligned with said centerline and having each of the remaining two apices disposed on opposite sides of said centerline, said elements recurring at distance intervals related to the desired speed along the course, the number of elements per unit distance being inversely proportional to said desired speed,
first detector means mounted on said vehicle for sensing the time duration of sensed pulses from a first portion of said element laterally displaced to one side of said centerline,
second photodetector means mounted on said vehicle for sensing the time duration of sensed pulses from a second portion of said elements laterally displaced to the other side of said centerline by the same displacement as said first portion,
comparing means operatively connected to said first and second detector means for comparing said sensed time durations and producing an error control signal proportional to the time difference therebetween and hence to the sense and magnitude of any lateral deviation of said vehicle from said centerline, and
steering control means operatively connected to said comparing means for steering said vehicle in a direction tending to diminish said error signal thereby compensating for said deviation.

14. A system as in claim 13 further comprising:
differentiating means operatively connected to one of said first and second detectors for generating uniformly dimensioned pulses in response to said sensed pulses,
integrating means connected to said differentiating means for generating a speed control signal proportional to the number of said uniformly dimensioned pulses occurring within a predetermined time period, and
speed control means connected to said integrating means for controlling the speed of said vehicle so as to keep said speed control signal substantially constant at a predetermined level thereby maintaining the desired speed which is inversely proportioned to the number of said elements per unit distance.

15. A system as in claim 14 further comprising:
counting means operatively connected to said differentiating means for counting and totalizing said uniformly dimensioned pulses, and
number comparing means for comparing said totalized number of pulses with a predetermined programmed number to provide a distance control signal when said programmed number is equalled or exceeded thereby indicating that a predetermined distance has been travelled.

16. A system as in claim 15 further comprising:
fail safe means connected to said differentiating means for sensing the elapsed time between said uniformly dimensioned pulses and for generating an automatic stopping signal if this time period exceeds a predetermined limit.

* * * * *